W. C. FOLSOM.
GATE.
APPLICATION FILED MAR. 25, 1910.
995,338.
Patented June 13, 1911.
2 SHEETS—SHEET 1.
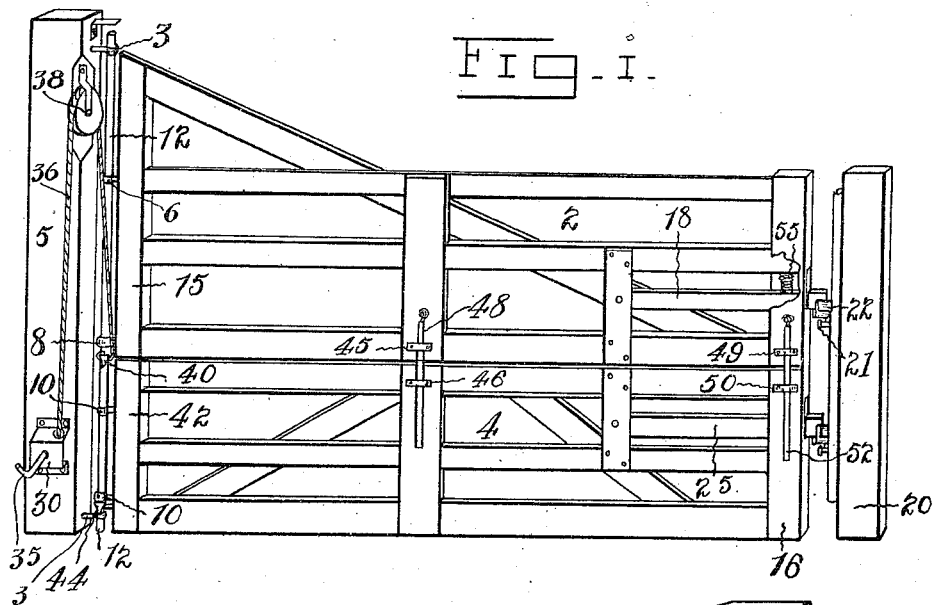
Fig. 1.
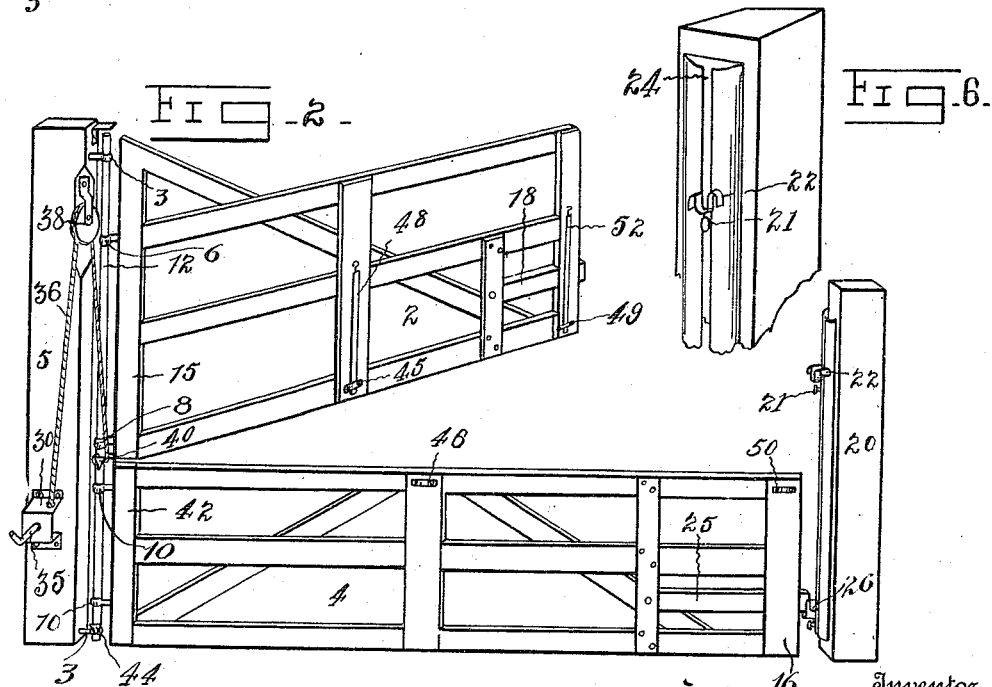
Fig. 2.
Fig. 6.
Witnesses
E. M. Noonan
J. B. Hanapel
Inventor
William C. Folsom
By
M. M. Cady
Attorney

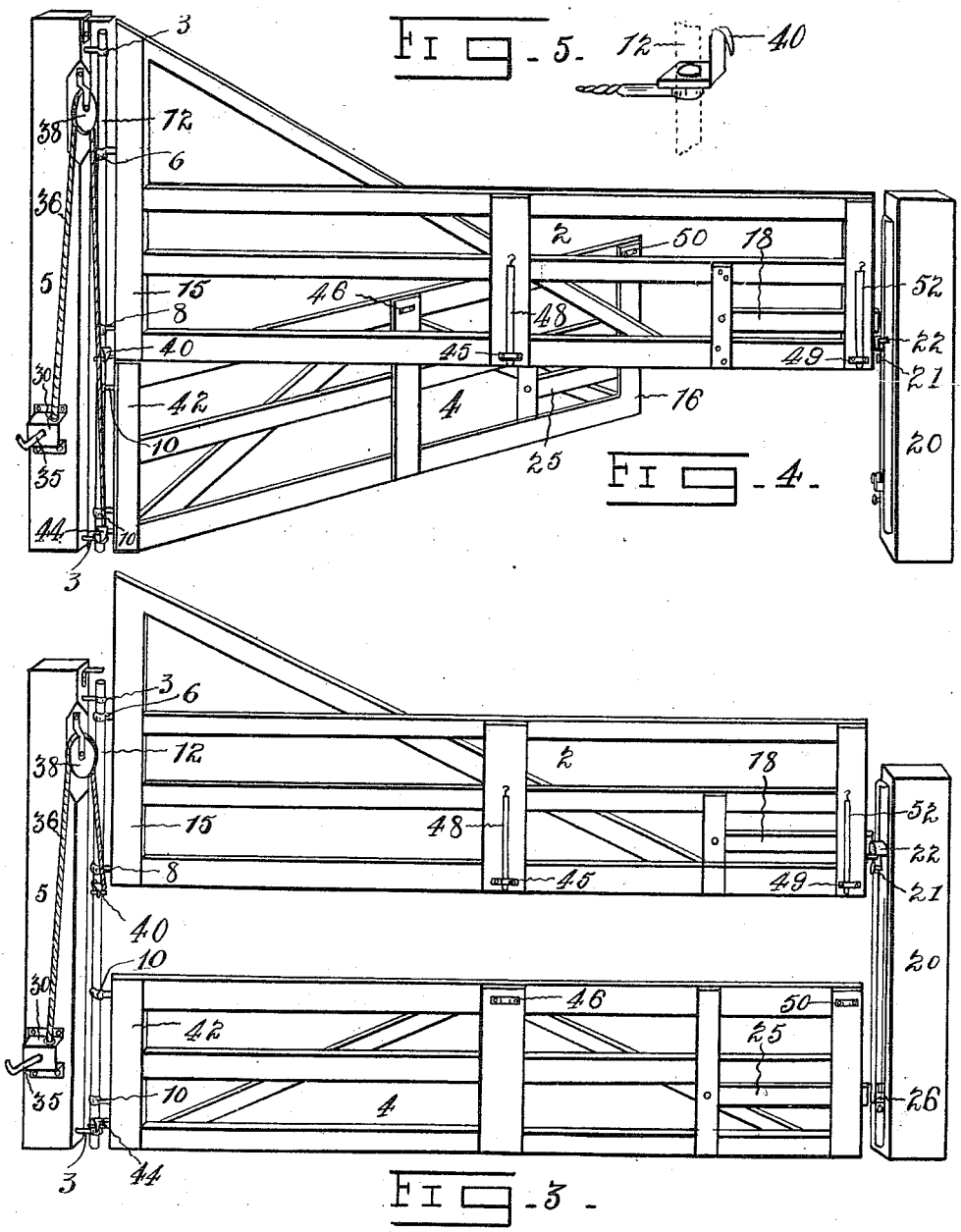

UNITED STATES PATENT OFFICE.

WILLIAM C. FOLSOM, OF POSTVILLE, IOWA.

GATE.

995,338.  Specification of Letters Patent.  Patented June 13, 1911.

Application filed March 25, 1910. Serial No. 551,591.

*To all whom it may concern:*

Be it known that I, WILLIAM C. FOLSOM, a citizen of the United States, residing at Postville, in the county of Allamakee and State of Iowa, have invented new and useful Improvements in Gates, of which the following is a specification.

My invention relates to farm gates with special reference to providing a gate which can be easily and quickly operated for all of the uses of the ordinary gate and adapted to be manipulated so as to separate the different classes of stock on farms that are herded in the same field or fields contiguous to each other.

To this end it consists in a substantial post to which a gate divided horizontally is pivotally hinged, to adapt it to be swung in either direction and raised and lowered at pleasure.

It further consists in certain means for manipulating or operating the gate to produce the effect desired in separating and caring for different classes of animals herded in the same or contiguous fields.

In order to present the objects, the mode of construction and the means whereby the objects of this invention are readily and easily accomplished, I herewith present the following specification which taken in connection with the drawings accompanying the same and forming a part hereof, will set out a full, clear and exact description, sufficient to enable one skilled in the art to which it appertains to make and use the same.

Figure 1 is a perspective view of the gate when closed. Fig. 2 is a perspective view of the gate with upper part opened. Fig. 3 is a perspective view of the gate with the upper part raised and lower portion closed and both portions locked. Fig. 4 is a perspective view of the gate with the upper portion closed and lower portion opened. Fig. 5 is a perspective view of hook attached to gate frame to which the cable for lifting the gate is removably attached. Fig. 6 is a perspective view of the front gate post showing the mode of adjusting the lock and catch on gate.

Like characters of reference denote corresponding parts in each of the figures.

My gate is divided longitudinally and in the drawings, 2 designates the upper member and 4 the lower member constituting the gate. The two members are constructed complete and independent of each other, and each may be operated alone or in conjunction with the other member to produce the particular result desired. A pintle rod 12 is secured to the post 5 by the brackets 3. To this rod 12 are pivoted two members 2 and 4 by the hinged brackets 6, 8 and 10, each provided with an opening through which the rod 12 passes. The upper member 2 is attached to the bar 12 in such a manner that it can be raised and lowered or swung around by its hinges on the rod 12.

In the front stile 16 of the gate 2 is a mortise through which a locking bar 18 projects and engages a catch 22 in the front post 20, which said catch is adapted to slide up and down in the groove 24 in said post 20 and be held at any given position by the thumb screw 21. The lower member 4 is also provided with a locking bar 25 which is adapted to engage a catch 26, which catch is also adapted to slide in the groove 24.

Upon one side of the post 5 is a box 30 which has in it a ratchet wheel upon a shaft and for the purpose of operating this shaft and the ratchet wheel there is provided a crank 35. To the ratchet wheel is secured a cable 36, which passes up over a pulley 38 and down on the other side and loosely attached to a clip 40 detachably secured to the post 15 of the upper member 2. Upon the lower member 4 there is also secured to the post 42 a catch 44 similar to the catch 40 on the member 2, whereby the cable 36 may be used to engage the member 2 or removed therefrom and engage the member 4. To keep the two members of the gate together there is provided a guide 45 in the member 2 and a guide 46 in the member 4 and a bar 48 is slid down in back of the guides 45 and 46, thus holding the two members rigidly together at their centers. There may also be provided similar loops 49 and 50, and a locking bar 52 adapted to engage these two loops. There is also a spring 55 over the locking bar 25.

The manner of operating my device will be readily understood. Starting with the gate in the position shown in Fig. 1 closed and locked and having all of the stock, cattle, sheep, pigs and the like on one side of the gate, and the operator desires to take the sheep from that lot and leave the cattle and hogs with the other stock in the lot, he grasps the crank 35 and turns it, which winds up the cable 36 and this cable passing over the pulley 38 and engaging the clip 40 on the post 15 raises the member 2 (see Fig. 3) sufficiently for the sheep to jump over the lower member 4 and all pass out, but the cattle and hogs cannot. Then if it is desired to separate the hogs from the cattle he lowers the upper member and opens the lower member 4. This allows the hogs to pass out and none of the cattle, as shown in Fig. 4, or he can attach the cable 36 to the clip 44 and lift up both members of the gate. If he desires to separate the sheep from the hogs and the cattle, but desires to have them in two different fields from the stock, then he turns out the lower member as shown in Fig. 4, and turns it around at right angles to the position that it is shown in Fig. 1, across the gate-way of the contiguous field, then the hogs and sheep can pass through beneath the member 2 and be separated from the cattle, then the sheep can jump over the member 4 and be separated from the hogs. This will leave the stock in three different lots or pastures. Hence, it will be seen by this mode of construction and manipulation that I can adapt my gate to the convenient separation of different animals of different size, and also operate my gate in the usual manner.

Having now described my invention what I claim and desire to secure by Letters Patent is:—

1. In a gate, a support, a gate divided longitudinally and consisting of two members, means for hinging both of the members to a common support and each adapted to be swung independent of the other, means attached to the support and adapted to engage the lower gate and raise both gates vertically, and means for locking the gates independent of each other.

2. In a gate, a support, a frame divided longitudinally forming two members both hinged to the support and adapted to be operated separately and independent of each other, means attached to the support and adapted to be brought into engagement with the upper member for raising and lowering the upper member without raising or lowering the lower member, a latch on the upper member, and a catch vertically adjustable and adapted to be engaged by the latch on the upper member and lock the upper member in its vertical positions.

3. In a gate, a front and rear support, a gate divided longitudinally and forming two independent members one over the other, a latch on each of the members, means for pivotally hinging separately both members to the rear support, means for raising the two members consisting of a pulley loosely attached to the rear support, a ratchet wheel pivoted to the rear support, a cable attached to the ratchet wheel and adapted to travel over said pulley and engage a catch on either of the members, means for operating the ratchet wheel to raise the members vertically, and means for locking either or both of the members in their different vertical positions to the front support.

4. A gate consisting of a front and rear support, a gate divided longitudinally and forming two independent members adapted to be operated separately or together, means for pivotally hinging both members to the rear support, a hook on each member, means attached to the rear support and engaging the hooks on the members for raising and lowering the members, means engaging both members for adapting them to be operated in conjunction with each other, a spring actuated latch on each member and catches on the front support adapted to be engaged by the latch on each member and said catches adjustable vertically on the front support.

5. In a gate of the class described, a post, companion gate sections slidably and pivotally mounted on said post, and detachable means connecting the gates with each other.

6. In a gate of the class described, a supporting post, gate sections arranged in superimposed relation and detachably connected with each other and operatively associated with the post to swing horizontally thereon or to slide longitudinally thereon, and mechanism to move the uppermost section of the gate to an elevated position when disconnected from its lowermost companion section.

7. In a gate of the character described, a main supporting post, an auxiliary post, extending from the main post, and gate sections slidably and pivotally mounted on the auxiliary post and detachably connected with each other.

In testimony whereof I have hereunto set my hand in presence of two subscribing witnesses.

WILLIAM C. FOLSOM.

Witnesses:
CHRIST MEIER,
WILLIAM GERICKE.